US012209553B2

(12) United States Patent
Kumar et al.

(10) Patent No.: US 12,209,553 B2
(45) Date of Patent: Jan. 28, 2025

(54) COMPACT TANDEM CYLINDER RECIPROCATING ENGINE FOR CO2 POWER GENERATION

(71) Applicant: INDIAN INSTITUTE OF SCIENCE, Karnataka (IN)

(72) Inventors: Pramod Kumar, Karnataka (IN); Siddhant Karmarkar, Karnataka (IN); Vijay Biradar, Karnataka (IN)

(73) Assignee: INDIAN INSTITUTE OF SCIENCE, Karnataka (IN)

( * ) Notice: Subject to any disclaimer, the term of this patent is extended or adjusted under 35 U.S.C. 154(b) by 0 days.

(21) Appl. No.: 18/259,956

(22) PCT Filed: Dec. 28, 2021

(86) PCT No.: PCT/IB2021/062358

§ 371 (c)(1),
(2) Date: Jun. 29, 2023

(87) PCT Pub. No.: WO2022/144755

PCT Pub. Date: Jul. 7, 2022

(65) Prior Publication Data

US 2024/0318554 A1 Sep. 26, 2024

(30) Foreign Application Priority Data

Dec. 29, 2020 (IN) ............................. 202041056952

(51) Int. Cl.
*F02G 1/044* (2006.01)
*F01B 7/16* (2006.01)
(Continued)

(52) U.S. Cl.
CPC ................ *F02G 1/044* (2013.01); *F01B 7/16* (2013.01); *F01B 31/08* (2013.01); *F01K 25/103* (2013.01); *F02G 2244/12* (2013.01)

(58) Field of Classification Search
CPC ........ F01B 7/16; F02G 1/044; F02G 2244/12; F02G 2244/50; F02G 2244/52
See application file for complete search history.

(56) References Cited

U.S. PATENT DOCUMENTS

2015/0211440 A1* 7/2015 Joffroy ...................... F25B 1/10
60/526
2017/0058701 A1* 3/2017 Guo ...................... F01K 23/064
(Continued)

FOREIGN PATENT DOCUMENTS

EP 3683421 A1 7/2020
FR 2998357 A1 * 5/2014 ............... F03G 6/00
WO WO 03093662 A1 11/2003

OTHER PUBLICATIONS

International Search Report for corresponding Application No. PCT/IB2021/062358, dated Apr. 26, 2022, 3 pages.

*Primary Examiner* — Jonathan R Matthias
(74) *Attorney, Agent, or Firm* — Dority & Manning, P.A.

(57) ABSTRACT

The present disclosure relates to an engine (100) including a cylinder (102) that is filled with carbon dioxide. A first piston (104) is slidably configured inside the cylinder (102) and being configured to form a first cylinder (108) with a first end (130) of the cylinder (102). A second piston (106) is slidably configured inside the cylinder (102) and being configured to form a second cylinder (110) with a second end (132) of the cylinder (102). A heater (112) is circumferentially disposed around the first cylinder (108) and the first piston (104) is configured to expand a hot carbon dioxide received inside the first cylinder (108) from the heater (112). A cooler (116) is circumferentially disposed around the second cylinder (110) and second piston (104) is configured to compress a cold carbon dioxide received inside the second cylinder (110) from the cooler (116).

10 Claims, 3 Drawing Sheets

(51) Int. Cl.
*F01B 31/08* (2006.01)
*F01K 25/10* (2006.01)

(56) References Cited

U.S. PATENT DOCUMENTS

2018/0320518 A1* 11/2018 Wei .......................... F01B 7/16
2020/0347799 A1* 11/2020 Schmitt .................... F01K 7/36

* cited by examiner

COMPACT TANDEM CYLINDER RECIPROCATING ENGINE FOR CO2 POWER GENERATION

CROSS-REFERENCE TO RELATED APPLICATIONS

This application is a US national phase of International Application No. PCT/IB2021/062358, filed Dec. 28, 2021, which, in turn, is based upon and claims the right of priority to Indian Application No. 202041056952, filed Dec. 29, 2020, the disclosures of both of which are hereby incorporated by reference herein in their entirety for all purposes.

TECHNICAL FIELD

The present disclosure relates to the field of reciprocating power blocks, and more particularly the present invention relates to a compact tandem cylinder engine for CO2 Brayton cycle.

BACKGROUND

Background description includes information that may be useful in understanding the present invention. It is not an admission that any of the information provided herein is prior art or relevant to the presently claimed invention, or that any publication specifically or implicitly referenced is prior art.

Supercritical carbon-dioxide (sCO2) Brayton cycles are considered as a leading alternative to Organic Rankine Cycles (ORC) for power generation. Operating pressure ratio in a s-CO2 Brayton is around 2.3, which is compared to approximately varies between 1300-2300 for steam operating with identical high side pressure of 210 bar. Thus, lower volumetric flow across a sCO2 turbine leads to significantly shorter blade heights compared to steam turbines. Turbine blade heights in a sCO2 turbine are of the order of 0.01 m for a 100 KW which can pose some manufacturing hurdles for a sub-megawatt power generation. Thus, positive displacement power-blocks for sCO2 are recommended for sub megawatt power generation. Positive displacement engines of reciprocating type are ideal for low volumetric flows and high operating pressures and temperatures.

However, the conventional engines include two cylinders that require two connecting rods and longer crank which increases the number of components and the manufacturing cost as well.

There is, therefore, a need of a tandem cylinder engine which has all the advantages of the conventional Brayton cycle but has a smaller size and manufacturing cost.

OBJECTS OF THE PRESENT DISCLOSURE

Some of the objects of the present disclosure, where at least one embodiment herein satisfies are as listed herein below.

It is an object of the present disclosure to provide a tandem cylindrical engine which is compact.

It is an object of the present disclosure to provide a tandem cylindrical engine with increased specific work output.

It is an object of the present disclosure to provide a tandem cylindrical engine at a reduced cost.

It is an object of the present disclosure to provide a tandem cylindrical engine which can operate in closed loop cycle and can work with variety of heat source and fuels such as biomass, solar etc.

SUMMARY

The present disclosure relates to the field of reciprocating power blocks, and more particularly the present invention relates to a compact tandem cylinder engine.

An aspect of the present disclosure pertains to an engine, includes one or more cylinders having a first end and a second end, and the one or more cylinders is at least partially filled with carbon dioxide. A first piston slidably configured inside the one or more cylinder at the first end, and being configured to form a first cylinder with a first end. A second piston slidably configured inside the one or more cylinder at second end, and being configured to form a second cylinder with the second end. A thermal barrier exists between the first piston and the second piston for facilitating isolation of heat and carbon dioxide between the first cylinder and the second cylinder. A heater is circumferentially disposed around the first cylinder and fluidically coupled with the first cylinder. The first piston is configured to expand a hot carbon dioxide received inside the first cylinder from the heater. A cooler is circumferentially disposed around the second cylinder and fluidically coupled with the second cylinder. The second piston is configured to compress a cold carbon dioxide received inside the second cylinder from the cooler. A cooling jacket is configured between the first piston and the cooler to extract heat from the second cylinder. A heat exchanger circumferentially configured between the heater and the cooler for facilitating heat exchange between the heater and the cooler, and the heat exchanger is fluidically coupled with the first cylinder and the second cylinder.

In an aspect, the first piston may have a first diameter and the second piston has a second diameter, and the first diameter may be larger than the second diameter.

In an aspect, the second piston may be mechanically coupled with the first piston with a first shaft such that the first piston and the second piston for facilitating a connected movement between a first position and the second position. At first position the first piston may move towards the first end and the second piston may move away from the second end. At the second position the first piston may move away from the first end and the second piston may move towards the second end. The second position may facilitate expansion of the hot carbon dioxide inside the first cylinder and compression of the cold carbon dioxide in the second cylinder.

In an aspect, a first end and the second end may include one or more openings for suction of the carbon dioxide inside the first cylinder and the second cylinder, and one or more opening for exhaust of carbon oxide from the first cylinder and the second cylinder.

In an aspect, a cold carbon dioxide discharged from the second cylinder may be configured to enter the first cylinder, after passing through any or combination of the heat exchanger, and the heater.

In an aspect, a hot carbon dioxide exhausted from the first cylinder may be configured to enter the second cylinder, after passing through any or combination of the heat exchanger, and the cooler.

In an aspect, the second piston may be mechanically configured with a crank shaft.

In an aspect, the crank shaft may be mechanically configured with a flywheel to store energy and deliver uniform torque In an aspect, the fly wheel may be operatively coupled with a generator.

In an aspect, the heater may be at least partially positioned on a top face and/or circumference of the one or more cylinder, and wherein the heater comprises any or combination of solar heater, coal heater, and biomass heater.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

The present disclosure relates to the field of reciprocating power blocks, and more particularly the present invention relates to a compact tandem cylinder engine.

Figure 1:
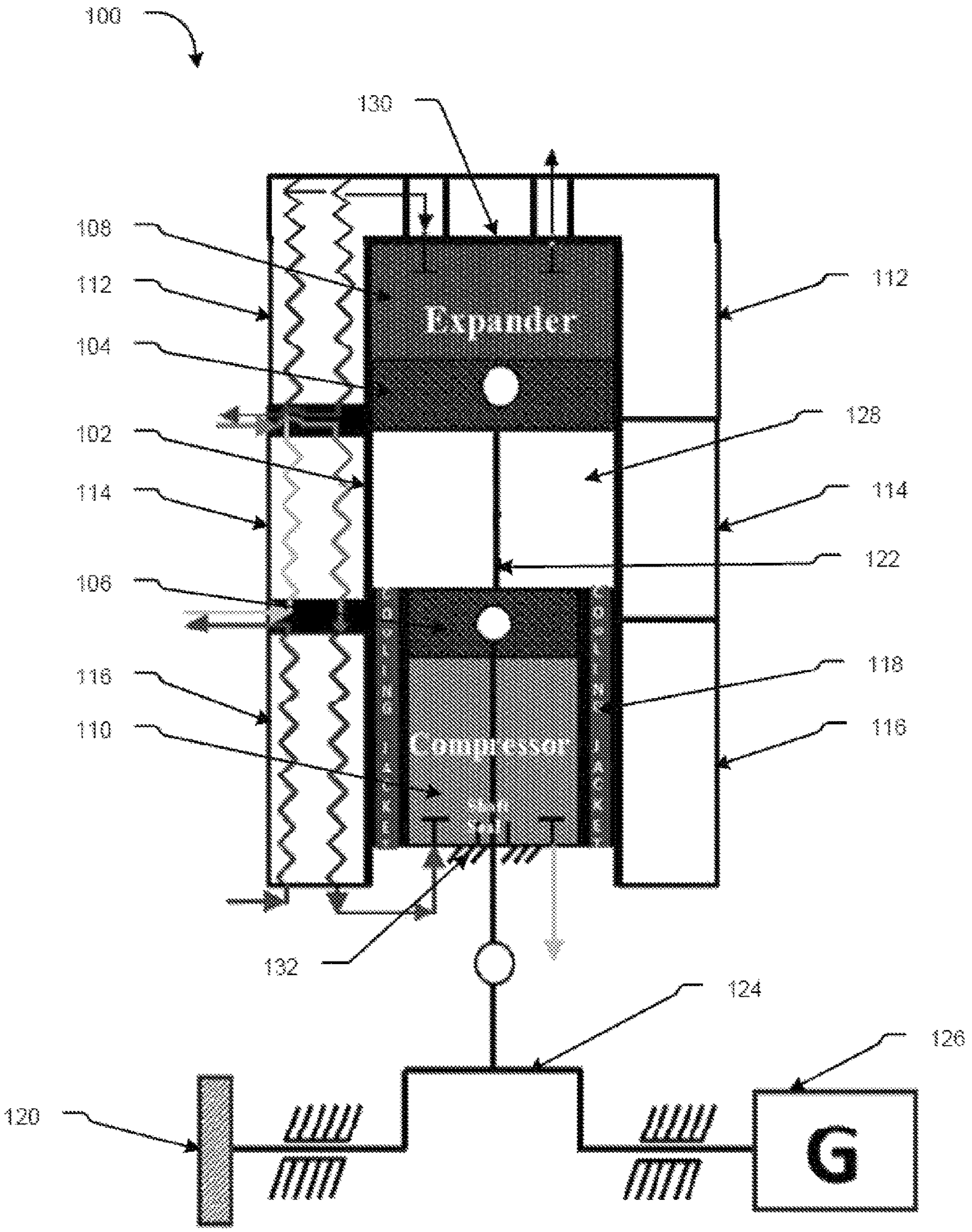
FIG. 1 illustrates an exemplary perspective view of the proposed tandem cylinder engine, in accordance with an embodiment of the present disclosure.

FIG. 1 illustrates an exemplary perspective view of the proposed tandem cylinder engine, in accordance with an embodiment of the present disclosure.

Figure 2:
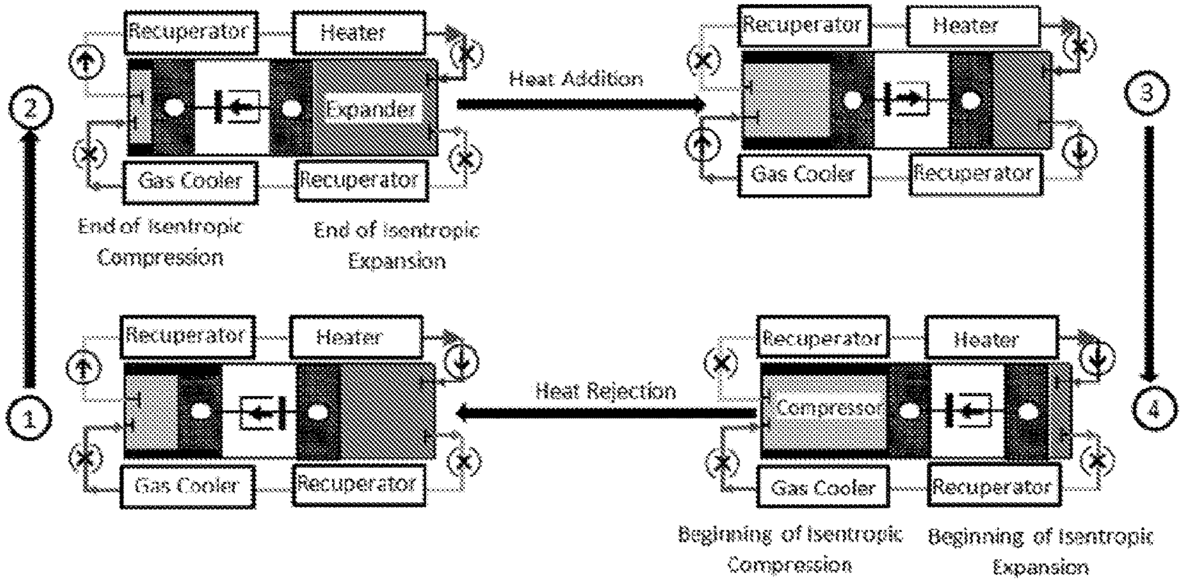
FIG. 2 illustrates an exemplary perspective view of different piston position during one crank rotation, in accordance with an embodiment of the present disclosure.

FIG. 2 illustrates an exemplary perspective view of different piston position during one crank rotation, in accordance with an embodiment of the present disclosure.

As illustrated, the proposed engine 100 can include one or more cylinders 102 having a first end 130 and a second end 132, and the one or more cylinders 102 may be at least partially filled with carbon dioxide. A first piston 104 may be slidably configured inside the cylinder 102 at the first end 130, and being configured to form an expander 108 (also referred as the first cylinder 108, herein) with a first end 130. A second piston 106 may be slidably configured inside the cylinder 102 at second end 132, and being configured to form a compressor 110 (also referred as the second cylinder 110, herein) with the second end 132. A fluid and thermal barrier 128 may exist between the first piston 104 and the second piston 106 for facilitating isolation between the first cylinder 108 and the second cylinder 110.

In an embodiment, a heater 112 may be circumferentially disposed around the first cylinder 108 and fluidically coupled with the first cylinder 108. The heater 112 can be at least partially positioned on a top face and/or circumferentially of the first end 130, which can facilitate an isentropic expansion. The first piston 104 may be configured to expand a hot carbon dioxide received inside the first cylinder 108 from the heater 112. The heater 112 comprises any or combination of solar heater, coal heater, and biomass heater. The first piston 104 can work as a expander and the second piston 106 can work as compressor. A cooler 116 may be circumferentially disposed around the second cylinder 110 and fluidically coupled with the second cylinder 110. This can facilitate isentropic compression process. The second piston 106 may be configured to compress a cold carbon dioxide received inside the second cylinder 110 from the cooler 116. A cooling jacket 118 may be configured between the second piston 106 and the cooler 116 to extract heat from the second cylinder 110. A heat exchanger 114 may be circumferentially configured between the heater 112 and the cooler 116 for facilitating heat exchange between the heater 112 and the cooler 116, and the heat exchanger 114 may be fluidically coupled with the first cylinder 108 and the second cylinder 110.

In an embodiment, the second piston 106 can be mechanically coupled with the first piston 104 with a first shaft 122 such that the first piston 104 and the second piston 106 for facilitating a connected movement between a first position and the second position between a first position and a second position. The first shaft 122 can be hollow or can be solid as well and can make sure that relative movement between the first piston and the second piston is zero. At first position the first piston can move towards the first end 130 and the second piston 106 can move away from the second end 132. At the second position the first piston 104 can move away from the first end 130 and the second piston 106 can move towards the second end 132. The second position can facilitate expansion of the hot carbon dioxide inside the first cylinder 108 and compression of the cold carbon dioxide in the second cylinder 110.

In an embodiment, the first piston 104 can have a first diameter and the second piston 106 can have a second diameter, and the first diameter can be larger than the second diameter. The first end 130 and the second end 132 of the cylinder 102 can include one or more first openings for suction of the carbon dioxide inside the first cylinder 108 and the second cylinder 110, and one or more second opening for exhaust of carbon oxide from the first cylinder 108 and the second cylinder 110. The one or more first openings and the one or more second openings can be associated with valves and seal in order to avoid leakage of the carbon dioxide from the first cylinder 108 and the second cylinder 110.

In an embodiment, a cold carbon dioxide can be discharged from the second cylinder 110 and can be configured to enter the first cylinder 108, after passing through any or combination of the heat exchanger 114, and the heater 112. A hot carbon dioxide exhausted from the first cylinder 108 can be configured to enter the second cylinder 110, after passing through any or combination of the heat exchanger 114, and the cooler 116. The second piston 106 can be mechanically configured with a crank shaft 124. The crank shaft 124 can be mechanically configured with a flywheel 120 to store energy and deliver uniform torque and the fly wheel 120 can be operatively coupled with a generator 126 for delivering the constant torque.

As illustrated in FIG. 2, when the second piston 106 moves (also referred as the second position) towards the second end 132, the first piston 104 moves away from the first end 130 since the first piston 104 and the second piston 106 are interconnected with the help of first shaft 122. This can cause expansion of the hot carbon dioxide inside the first cylinder 108 and compression of the cold carbon dioxide inside the second cylinder 110. The discharged cold carbon dioxide from the second cylinder 110 can be passed through the heat exchanger 114 and the heater 112 before entering the first cylinder 108. When the second piston 106 moves away (also referred as the first position) from the second end 132, the first piston 104 moves towards the first end 130. This can cause exhaust of the hot carbon dioxide from the first cylinder 108. The exhausted hot carbon dioxide from the second cylinder 110 can be passed through the heat exchanger 114 and the cooler 116 before entering the second cylinder 110.

Figure 3:
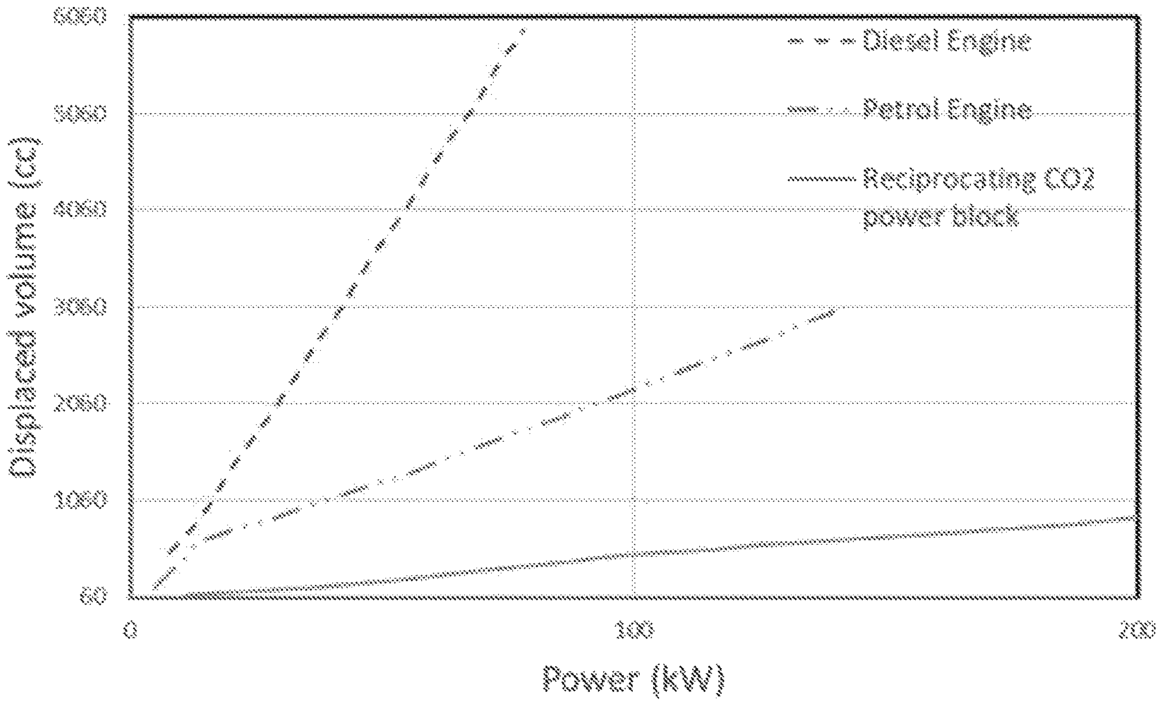
FIG. 3 illustrates variation of Swept Volume with Shaft Power the conventional simple recuperated s-CO2 Brayton cycle, in accordance with an embodiment of the present disclosure.

FIG. 3 illustrates variation of swept volume with shaft power for the simple recuperated s-CO2 Brayton cycle, in accordance with an embodiment of the present disclosure.

As illustrated, required cylindrical displacement required for a various power levels are more in case of Diesel and Petrol engines. Thus, the proposed engine can help the engine achieving higher specific work output and low efficiency than the Petrol or Diesel engine or vice-verse.

Figure 4:
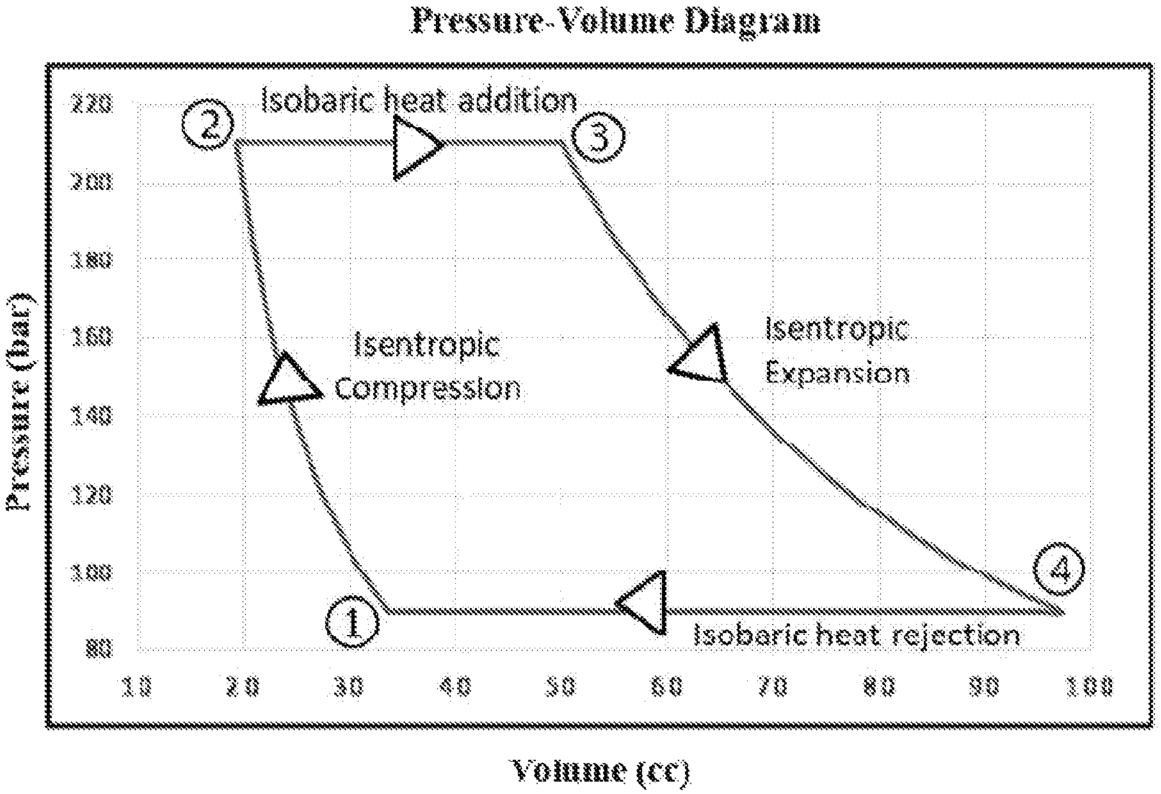
FIG. 4 illustrates pressure volume plot of the conventional Brayton cycle, in accordance with an embodiment of the present disclosure.

FIG. 4 illustrates pressure volume plot of the conventional Brayton cycle, in accordance with an embodiment of the present disclosure.

Figure 5:
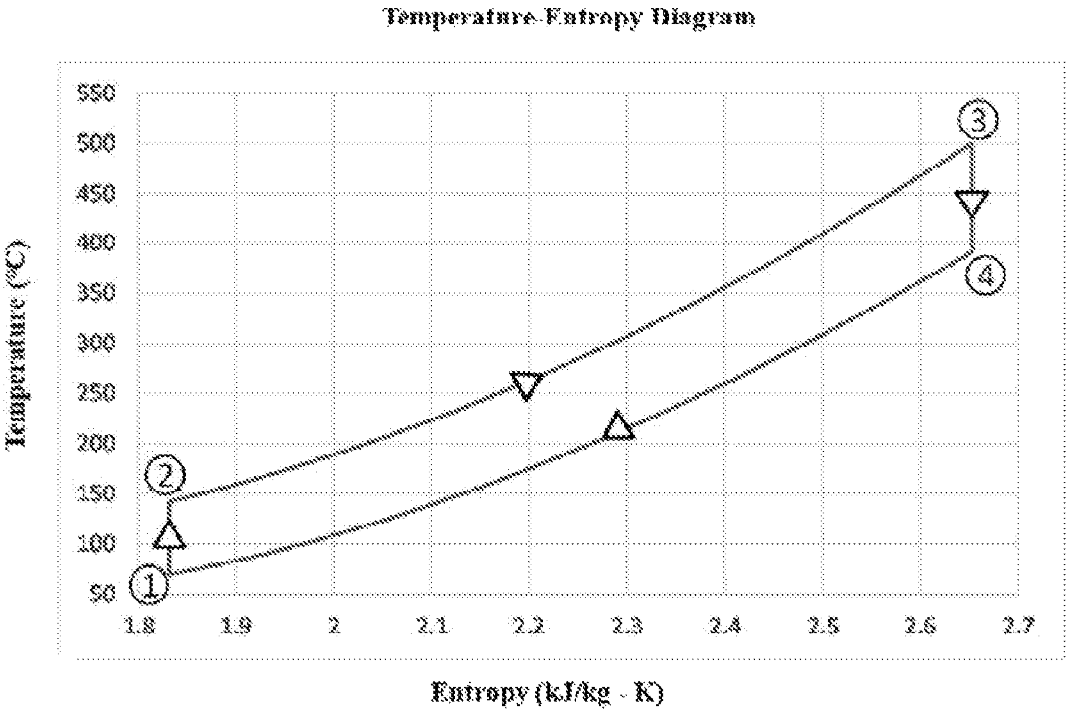
FIG. 5 illustrates a plot between temperature and specific entropy of the conventional Brayton cycle, in accordance with an embodiment of the present disclosure.

FIG. 5 illustrates a plot between temperature and specific entropy of the conventional Brayton cycle, in accordance with an embodiment of the present disclosure.

As illustrated, a plot between temperature and specific entropy of the conventional Brayton cycle is shown. Table 1 shows a comparison between the petrol engine and the conventional Brayton cycle.

TABLE 1

| Parameter | Generic Petrol Engine | Ideal Simple recuperated $CO_2$ Brayton Cycle |
|---|---|---|
| Operating Frequency | 50 Hz | 50 Hz |
| Power at 50 Hz | 11.54 kW | 100 kW |
| Displacement | 500 cc | 492 cc |
| Power Density | 0.023 kW/cc | 0.203 kW/cc |

It can be seen that the power density of the Brayton Cycle is increased as compared to generic petrol engine. The increase in the power density is achieved for almost same displacement volume.

The present disclosure provides a tandem cylinder engine having both the expander and compressor in a single cylinder thereby, allowing a compact engine with small footprint. Also, the compressor is associated with a single crank shaft for delivering uniform torque. Therefore, less hardware is required for the proposed engine. The proposed engine exercise a CO2 Brayton cycle increases specific work output.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The proposed invention provides a tandem cylindrical engine which is compact.

The proposed invention provides a tandem cylindrical engine with increased specific work output.

The proposed invention provides a tandem cylindrical engine at a reduced cost.

The proposed invention provides a tandem cylindrical engine which can operate in closed loop cycle and can work with variety of heat source and fuels such as biomass, solar etc.

We claim:

1. An engine comprising:

one or more cylinders having a first end and a second end, and the one or more cylinders is at least partially filled with carbon dioxide;

a first piston slidably configured inside the one or more cylinder at the first end, and being configured to form a first cylinder with a first end;

a second piston slidably configured inside the one or more cylinder at second end, and being configured to form a second cylinder with the second end, wherein a fluid thermal barrier exists between the first piston and the second piston for facilitating isolation between the first cylinder and the second cylinder;

a heater is circumferentially and/or top disposed around the first cylinder and fluidically coupled with the first cylinder, wherein the first piston is configured to expand a hot carbon dioxide received inside the first cylinder from the heater;

a cooler is circumferentially disposed around the second cylinder and fluidically coupled with the second cylinder, wherein the second piston is configured to compress a cold carbon dioxide received inside the second cylinder from the cooler, and wherein a cooling jacket is configured between the first piston and the cooler to extract heat from the second cylinder; and a heat exchanger circumferentially configured between the heater and the cooler for facilitating heat exchange between the heater and the cooler, and the heat exchanger is fluidically coupled with the first cylinder and the second cylinder.

2. The engine as claimed in claim 1, wherein the first piston has a first diameter and the second piston has a second diameter, wherein the first diameter may be larger than the second diameter.

3. The engine as claimed in claim 1, wherein the second piston is mechanically coupled with the first piston with a first shaft such that the first piston and the second piston for facilitating a connected movement between a first position and the second position between a first position and a second position, and wherein at first position the first piston moves towards the first end and the second piston moves away from the second end (132), and wherein at the second position the first piston moves away from the first end and the second piston moves towards the second end, and wherein the second position facilitates expansion of the hot carbon dioxide inside the first cylinder and compression of the cold carbon dioxide in the second cylinder.

4. The engine as claimed in the claim 1, wherein the first end and the second end comprise one or more openings for suction of the carbon dioxide inside the first cylinder and the second cylinder, and one or more openings for exhaust of carbon oxide from the first cylinder and the second cylinder.

5. The engine as claimer in claim 1, wherein a cold carbon dioxide discharged from the second cylinder is configured to enter the first cylinder, after passing through any or combination of the heat exchanger, and the heater.

6. The engine as claimer in claim 1, wherein a hot carbon dioxide exhausted from the first cylinder is configured to enter the second cylinder, after passing through any or combination of the heat exchanger, and the cooler.

7. The engine as claimed in claim 1, wherein the second piston is mechanically configured with a crank shaft.

8. The engine as claimed in claim 7, wherein the crank shaft is mechanically configured with a flywheel to store energy and deliver uniform torque.

9. The engine as claimed in claim 7, wherein the flywheel is operatively coupled with a generator.

10. The engine as claimed in claim 1, wherein the heater is at least partially positioned on a top face of the one or more cylinder, and wherein the heater comprises any or combination of solar heater, coal heater, and biomass heater.

* * * * *